(12) United States Patent
Seddiki et al.

(10) Patent No.: US 7,397,149 B2
(45) Date of Patent: Jul. 8, 2008

(54) METHOD AND A SYSTEM FOR MONITORING AND REGULATING THE POWER CONSUMED BY A TRANSPORT SYSTEM

(75) Inventors: Rachid Seddiki, Paris (FR); Daniel Cornic, Fourqueux (FR)

(73) Assignee: Alstom, Levallois-Perret (FR)

( * ) Notice: Subject to any disclaimer, the term of this patent is extended or adjusted under 35 U.S.C. 154(b) by 519 days.

(21) Appl. No.: 10/418,100

(22) Filed: Apr. 18, 2003

(65) Prior Publication Data

US 2003/0230994 A1 Dec. 18, 2003

(30) Foreign Application Priority Data

May 3, 2002 (FR) .................................. 02 05600

(51) Int. Cl.
*H02J 1/10* (2006.01)
(52) U.S. Cl. .................................. 307/62; 105/49; 246/5
(58) Field of Classification Search .................... 307/62; 246/5; 105/49
See application file for complete search history.

(56) References Cited

U.S. PATENT DOCUMENTS

| | | | | |
|---|---|---|---|---|
| 4,467,314 | A * | 8/1984 | Weikel et al. ............... | 700/295 |
| 4,476,398 | A * | 10/1984 | Hallam ........................ | 307/39 |
| 5,280,418 | A * | 1/1994 | Griffin ......................... | 363/34 |
| 5,346,163 | A * | 9/1994 | Momma et al. ............... | 246/5 |
| 2002/0029097 | A1 * | 3/2002 | Pionzio et al. ............... | 700/286 |
| 2002/0174798 | A1 * | 11/2002 | Kumar ......................... | 105/50 |
| 2003/0158631 | A1 * | 8/2003 | Masuda et al. ............... | 700/286 |

FOREIGN PATENT DOCUMENTS

| | | |
|---|---|---|
| DE | 196 54 960 A | 7/1998 |
| EP | 0 997 340 A | 5/2000 |

* cited by examiner

*Primary Examiner*—Michael J Sherry
*Assistant Examiner*—Daniel Cavallari
(74) *Attorney, Agent, or Firm*—Sughrue Mion, PLLC

(57) ABSTRACT

A method of monitoring and regulating the power and the energy consumed by a transport system including electrically propelled vehicles, said transport system including a power supply system including one or more power supply substations connected to an external electrical power supply network, said power supply substation or substations supplying energy to traction substations supplying power to power supply line sections having vehicle-mounted current pick-up means connected thereto, each vehicle carrying a power converter which is supplied with power by said current pick-up means and which monitors the power supplied to a traction motor of said vehicle, which method includes the following steps:

measuring the instantaneous electrical power and/or energy drawn from the external electrical power supply network by said power supply substation or substations, and if the power or energy drawn from the external network tends to exceed an assigned threshold, sending one or more vehicles a set point acting on the converter on board said vehicle to reduce temporarily the power and/or the speed of rotation of the traction motor.

24 Claims, 6 Drawing Sheets

METHOD AND A SYSTEM FOR MONITORING AND REGULATING THE POWER CONSUMED BY A TRANSPORT SYSTEM

The invention relates to a method and to a system for monitoring and regulating the power and the energy consumed by a transport system using electrically propelled vehicles and whose electrical power requirements are supplied by an external electrical power supply network.

BACKGROUND OF THE INVENTION

Transport systems such as underground railway, tram, trolleybus and guided road vehicle systems have high power requirements which are unevenly distributed through the day and essentially consist of the traction power that is dissipated by the vehicles of the system. The power requirements peak in the morning and in the afternoon, at times corresponding to the morning and evening rush hours. It is therefore not advantageous for companies operating these transport systems to acquire their own electrical power stations to supply electrical power, since the power stations would have to be rated to cater for the peak power in the rush hours, and would rarely be operated at their maximum efficiency.

It is therefore more economic for companies operating these transport systems to obtain electrical power from external electrical power distribution companies in the public or private sector. These companies operate electrical power supply networks that provide a very reliable supply and are interconnected to deal with peak power demand. However, most power distribution company price structures take account of a nominal power and energy specified in a contract negotiated with the client, and they bill clients for high additional costs whenever the power or the energy consumed by the client exceeds the nominal power or energy. It is therefore important for operators of these transport systems to optimize the peak power drawn from the external electrical power supply network, peak limiting having a significant financial impact by limiting the nominal power itself and the occasions on which power demand exceeds the nominal power. The same applies for the electrical energy consumed.

OBJECTS AND SUMMARY OF THE INVENTION

The object of the present invention is therefore to provide a method of monitoring and regulating the power and the energy consumed by a transport system which limits the peak power and energy demands from the electrical power supply network, in order to optimize operating costs, without significantly reducing the quality of service rendered to users. Another object of the invention is to provide a system for implementing the above method.

The invention provides a method of monitoring and regulating the power and the energy consumed by a transport system including electrically propelled vehicles, the transport system including a power supply system including one or more power supply substations connected to an external electrical power supply network, the power supply substation or substations supplying energy to traction substations supplying power to power supply line sections having vehicle-mounted current pick-up means connected thereto, each vehicle carrying a power converter which is supplied with power by the current pick-up means and which monitors the power and/or the speed of rotation of the traction motor of the vehicle, which method includes the following steps:

measuring in real time the instantaneous electrical power and/or energy drawn from the external electrical power supply network by the power supply substation or substations, and if the power or energy drawn from the external network tends to exceed an assigned threshold, sending a set point to one or more vehicles to act on the converter on board the vehicle to reduce temporarily the power and/or the speed of rotation of the traction motor.

Particular embodiments of the method according to the invention may include one or more of the following features in isolation or in any technically feasible combination:

the vehicles move in accordance with a control profile whereby starting is effected in compliance with a constant traction force set point which is applied until a line current $I_A$ flows in the traction motor, the value of the current $I_A$ being known to the onboard converter and corresponding to the nominal operating current of the traction motor or to a lower value modulated as a function of the load of the vehicle, subsequent acceleration of the vehicle up to a maximum speed conforming to an equal power law;

the vehicles move in accordance with a control profile whereby starting is effected in compliance with a law specifying how speed is increased up to an authorized maximum speed;

the set point sent to the vehicle is a reduction set point $\alpha$ for the limit line current $I_A$ normally assigned by the converter on board the vehicle, the set point $\alpha$ operating on the converter on board said vehicle to limit the line current supplied to the traction motor to a value $I_L = \alpha \cdot I_A$;

the set point sent to the vehicle is a reduction set point $\beta$ for the maximum speed normally assigned by the converter on board said vehicle, the set point $\beta$ operating on the converter on board the vehicle to limit the speed of rotation of the traction motor;

the vehicles receiving the set points $\alpha$ and/or $\beta$ are selected from the vehicles of the transport system as a function of a critical status index Vc assigned to each vehicle and a critical status index Zc assigned to each power supply line section;

the critical status index Vc assigned to each vehicle takes account of late running of the vehicle, the time interval between successive vehicles, and/or the load of the vehicle, and the critical status index Zc assigned to each power supply line section allows for the status of the traction substations and/or the power supply substation supplying power to the section and the geometry of the route followed by the vehicles in the section;

the set points $\alpha$ and/or $\beta$ received by each vehicle is modulated as a function of the critical status index Vc assigned to the vehicle;

if the transport system includes significant infrastructure auxiliary systems supplied with electrical power by a power supply substation, as well as sending set points to the various vehicles, set points are sent for reducing the operating regime of the less critical infrastructure auxiliary systems, such as ventilation, air conditioning or lighting systems of stations;

the value of the assigned power and/or energy threshold is a function respectively of power and energy maximums specified in a contract negotiated with the external electrical power supplier, the thresholds being adaptable as a function of the time or the season to adapt to the profile of the contract;

the power and energy thresholds are temporarily assigned values below the nominal power and energy values specified in the contract in order to save energy and power;

the method includes a step of measuring electrical parameters supplied by the traction substations and the measurement results are used to select vehicles to which the set points α and/or β are sent.

The invention also provides a system for monitoring and regulating the power and the energy consumed by a transport system including a plurality of vehicles having an electric traction motor, the transport system including a power supply substation connected to an external electrical power supply network, the power supply substation supplying energy to traction substations supplying power to sections of power supply line having vehicle-mounted current pick-up means connected thereto, each vehicle carrying a power converter which is supplied with power by the current pick-up means and which monitors the power and the speed of rotation of the traction motor of the vehicle, which system includes:

means for measuring and metering the electrical power drawn from the external electrical power supply network by the power supply substation, detector means for detecting times at which the power and/or the energy drawn from the external network tends to exceed an assigned threshold, and means for sending a set point(s) to one or more vehicles if the power or the energy drawn from the external network tends to exceed the threshold, the set points operating on the converter on board the vehicle to reduce temporarily the power and/or the speed of rotation of the traction motor.

According to one feature of a system according to the invention, the set points sent to the vehicle are line current reduction set points α and/or speed reduction set points β, the set point α operating on the converter on board the vehicle to limit the line current supplied to the traction motor to below the limit line current $I_A$ normally assigned, and the set point β operating on the converter on board to limit the speed of rotation of the traction motor.

According to one feature of a system according to the invention, the set points are sent to the vehicles from a centralized control station by means of a radio transmission system or, in a station, by an infrared transmission system.

BRIEF DESCRIPTION OF THE DRAWINGS

The objects, aspects and advantages of the present invention will be better understood from the following description of embodiments of the invention, which is given by way of non-limiting example and with reference to the accompany drawings, in which.

MORE DETAILED DESCRIPTION

To facilitate a reading of the drawings, only the elements necessary to understanding the invention are shown. The same elements are identified by the same reference numbers in all figures in which they appear.

Figure 1:
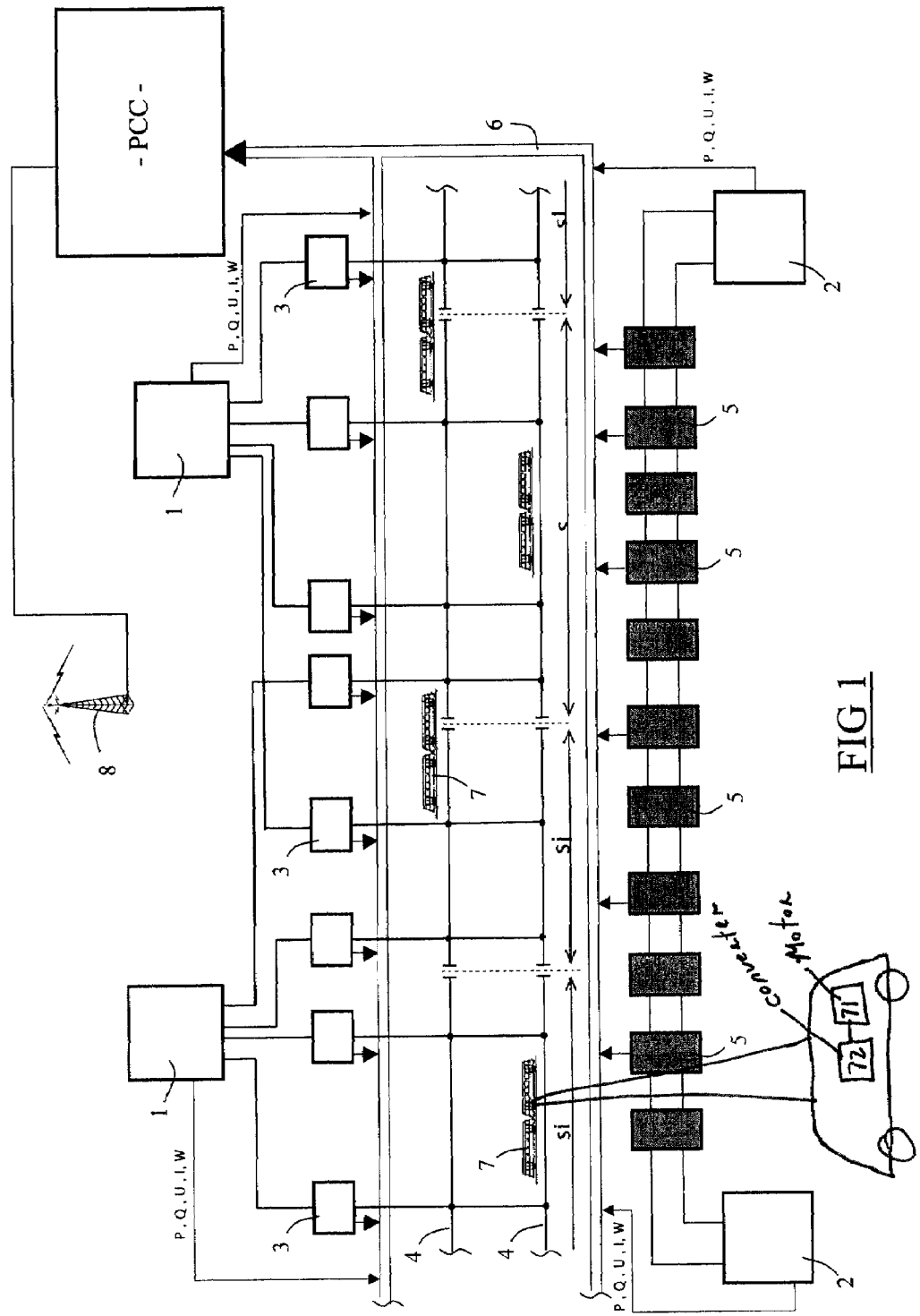
FIG. 1 is a theoretical diagram showing a power supply system for electrically propelled vehicles of an underground railway system regulated by a method according to the invention.

FIG. 1 is a simplified representation of a power supply system for an underground railway system. The power supply system shown in this figure includes two pairs of high-voltage substations 1 and 2 each supplied with electrical power by power supply lines, not shown in the figures, belonging an external electrical power supply network, such as the EDF network in France. The supply voltage when this kind of electrical power supply network has to satisfy high power demands is typically of the order of 110 kV. The high-voltage substations 1 and 2 each include metering points at which the active power P, the reactive power Q and the wattage W drawn from the external network by the high-voltage substation are measured. The external electrical power supplier uses the results of these measurements to bill the client for electricity consumption. The high-voltage substations 1 and 2 also include measurement points for measuring the voltage U and the current I of each phase of the current supplied.

As shown in FIG. 1, the two high-voltage substations 1 convert the supply voltage from 110 kV to a voltage of the order of 20 kV, which is redistributed to traction substations 3 disposed approximately every 2.2 km along the tracks. In the traction substations 3, the current is rectified and the voltage reduced to 750 V DC and fed to a power supply line 4 divided into mutually isolated sections Si, Sj, Sk, Sl. The power supply line sections Si, Sj, Sk, Sl comprise power rails disposed alongside the tracks and supplying electrical power to vehicles 7 of the transport system, which have current pick-up devices, such as shoes rubbing on the power rails. They can advantageously be bridged to overcome a power supply failure on one line section, due to failure of one of the high-voltage substations, for example.

The two high-voltage substations 2 supply power at 20 kV to infrastructure auxiliary systems of the transport system, such as stations 5, which include transformers for supplying power to the electrical power consuming elements of the station, such as ventilation, air conditioning and lighting systems and escalators.

Measurements P, Q, W, U, I obtained at the metering and measurement points of the high-voltage substations 1 and 2 are sent over a transmission network 6 such as an optical fiber network to a centralized control station PCC which advantageously also receives via the transmission network 6 information relating to the output voltage and current of the traction substations 3, obtained in the conventional way by means of sensors. The centralized control station PCC also receives the location of the various vehicles 7 on the tracks, obtained in the conventional way from means such as beacons disposed along the tracks or from the satellite-based Global Positioning System (GPS).

Finally, the vehicles 7 of the transport system each have one or more electric traction motors 71 and an onboard DC/DC or DC/AC converter 72 for continuously varying the current and the voltage at the terminals of the traction motors, which can be DC motors, synchronous motors, or asynchronous motors.

Figure 2:
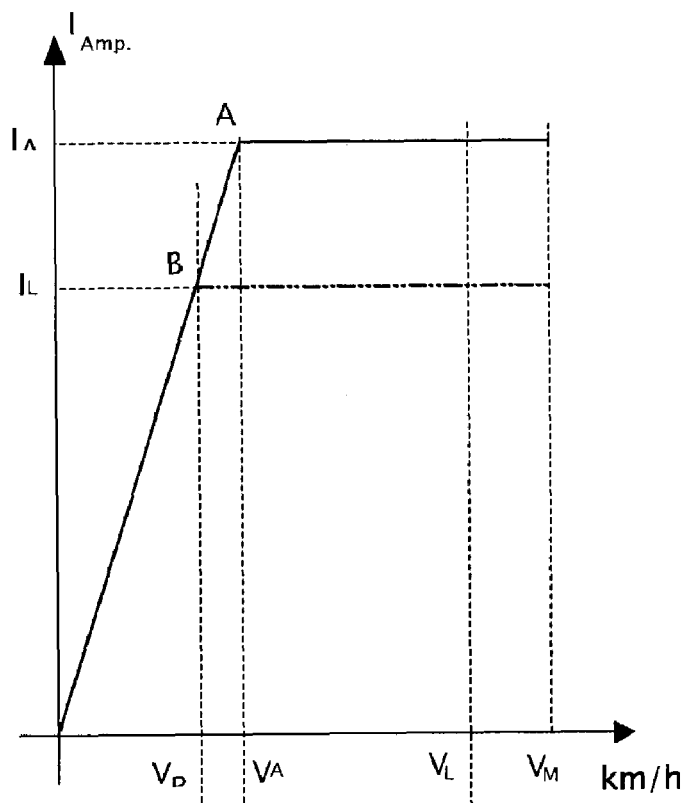
FIGS. 2 and 3 are graphs respectively showing, for one particular embodiment of the invention, one example of the evolution of the line current and the traction force of the traction motors of the vehicles of the FIG. 1 underground railway system as a function of the speed of the vehicles and the influence of the regulation method on the evolution of the line current.
Figure 3:
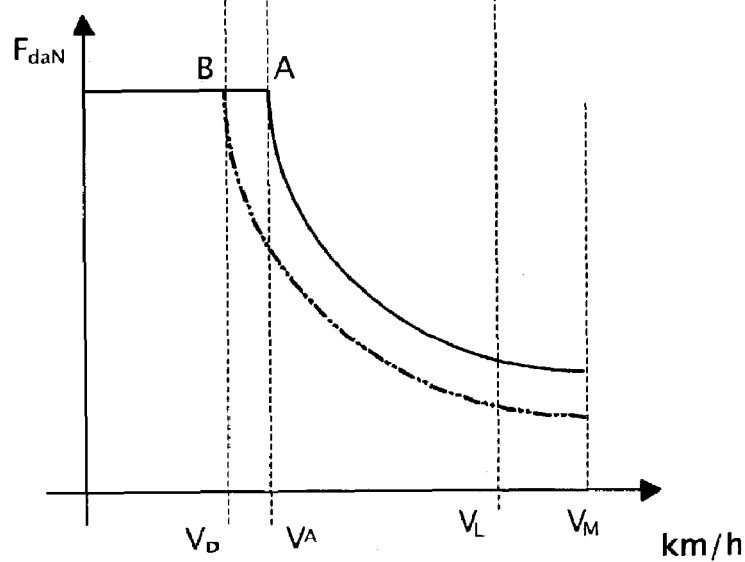

The vehicles of the transport system are driven entirely manually, or in manual mode subject to the intervention of an automatic protection system, or entirely automatically, and preferably in accordance with a profile, shown in FIGS. 2 and 3, that is optimized from the power consumption point of view. As shown in those figures, under normal conditions the vehicles move conventionally, starting from stationary with a constant traction force set point $F_{cons}$, which applies up to a point A at which the converter limits the current $I_A$ flowing to the traction motor to a defined nominal traction motor current and at which the vehicle reaches a speed $V_A$, after which the vehicle accelerates up to its maximum speed $V_M$ in accordance with an equal power law $P_A = F \times V$ = constant.

In a variant of this embodiment, the traction force set point $F_{cons}$ is slaved to the load of the vehicle and the traction force set point $F_{cons}$ is reduced during the starting phase if the vehicle is carrying few passengers. In this variant, the vehicles are equipped with an information system indicating the vehicle passenger load and a control system for calculating the traction force set point $F_{cons}$ as a function of the load to obtain a given acceleration of the vehicle regardless of the load. Accordingly, if the vehicle is lightly loaded, the traction force is reduced and the vehicle reaches the speed $V_A$ with a motor line current $I_A$ less than the nominal traction motor current, which is preferably such that the current $I_A$ at full load is equal to the nominal traction motor current.

The regulation method according to the invention implemented at the centralized control station PCC is described next with reference to the FIG. 4 flowchart.

In a first step 101, the centralized control station PCC calculates the total power drawn from the external electrical power supply network in real time from the power information P sent from each metering point in the high-voltage substations 1 and 2.

In a second step 102, the calculated total power is compared to an assigned power threshold Pmax that corresponds to the nominal power at a given time t, for example. The power threshold Pmax is extracted from a memory which stores the nominal power profile specified in the contract negotiated with the external supplier of electrical power.

When the total power consumed tends to exceed the assigned power threshold Pmax, the next step of the method is a step 103 in which an alarm is sent to the centralized control station PCC to alert an operator responsible for monitoring traffic.

During step 104, the operator analyses the overloading of the power supply network as displayed on a monitoring console displaying the power consumed at the traction substations 3 and the status of the traffic on each line section, which is advantageously determined as a function of the late running of the vehicles, the time interval between vehicles and the vehicle loads.

In step 105, to reduce the overall power demand, the operator activates manually the sending of pre-programmed set points to the vehicles 7 on a line section supplied with power by an overloaded substation 3, if the traffic status on the line section concerned is not critical; if the traffic status on the line section concerned is critical, pre-programmed set points are sent progressively to the vehicles 7 on adjacent line subsections.

The pre-programmed set points are sent to the vehicles 7 by a radio transmitter 8 and are line current reduction set points $\alpha$. They correspond to a reduction coefficient to be applied to the maximum current $I_A$ that the converter on board the vehicle 7 receiving the set point is usually authorized to supply to the traction motor. The current reduction set points $\alpha$ are equal to 70%, for example. In the example shown in FIGS. 2 and 3, the line current that the onboard converter is authorized to supply to the traction motor is limited to a current $I_L = \alpha \cdot I_A$.

Limiting the line current supplied by the onboard converter to a value $I_L$ less than the traction motor current $I_A$ preserves an unchanged traction force set point during starting of the vehicle, and which is applied up to a point B corresponding to the limited line current $I_L$, subsequent acceleration of the vehicle then conforming to an equal power law $P_L = \alpha \cdot P_A$.

The line current reduction set point $\alpha$ supplied by the onboard converter therefore has the advantage of limiting the power consumed by the vehicle without changing the acceleration of the vehicle on starting, which preserves the dynamic parameters of the vehicle for leaving a station, or for towing or pushing, and in order to reach the cut-off speed quickly, so saving energy.

The method then loops to step 101 so that in subsequent steps the operator can adjust the pre-programmed current reduction set points $\alpha$ sent to the vehicles 7 as a function of the tendency of the power to continue exceeding the power threshold Pmax, or conversely to stabilize, and the tendency to fall measured in steps 101 and 102.

Finally, when in step 102 the total power drawn from the network is detected as no longer having any tendency to exceed the assigned threshold Pmax, in step 110 the operator progressively eliminates any limitation reduction set points $\alpha$ previously sent to the vehicles, after which the method returns to step 101.

In a simplified embodiment of the power regulation method previously described, during step 103 the operator can analyze the power supply network overload based only on data relating to the power consumed by the high-voltage substations 1 displayed on a surveillance console and then, in step 104, activate the process of sending current reduction set points $\alpha$ to the complete fleet of vehicles 7 or to only a portion of the fleet, chosen arbitrarily, as a function of the magnitude of the power overload displayed on the surveillance console. This embodiment is particularly suitable for transport systems with no means of locating vehicles and/or in which the centralized control station PCC does not receive information relating to the output voltage and current of the traction substations.

Figure 5:
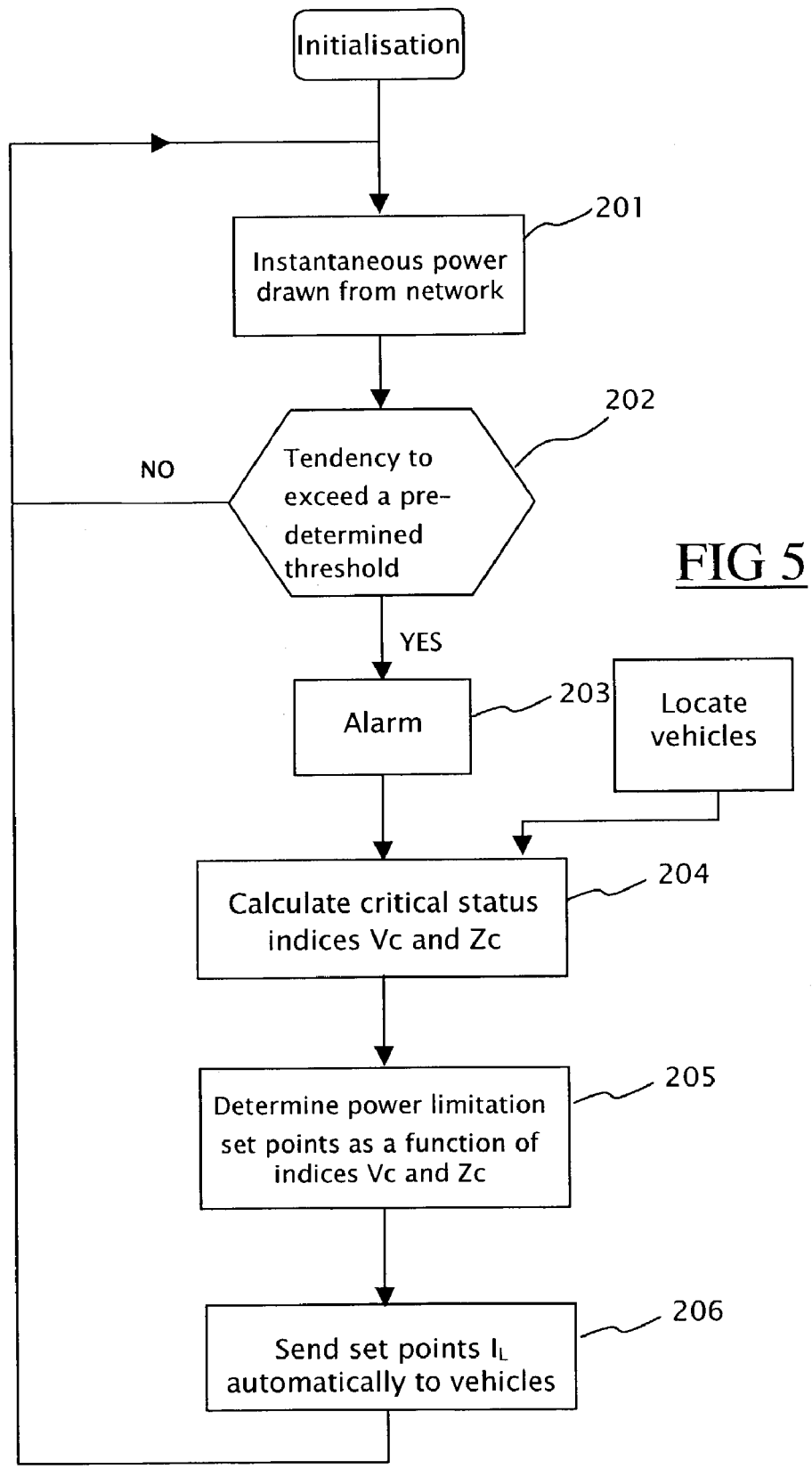

FIG. 5 shows another embodiment of a power regulation method according to the invention applied to the transport system shown in FIG. 1. This regulation method is implemented by software installed in the centralized control station PCC.

As shown in FIG. 5, the method includes a first step 201 in which the total power drawn from the external electrical power supply network is calculated in real time from power information P sent from each of the metering points in the high-voltage substations 1 and 2.

In step 202, the calculated total power is compared to an assigned power threshold Pmax corresponding to the value of the nominal power at the given time t, the power Pmax being extracted from a memory which stores the nominal power profile specified in the contract negotiated with the external supplier of electrical power.

If the total power drawn from the network has no tendency to exceed the threshold Pmax, the method returns to step 201.

If, after step 202, the total power drawn from the external network tends to exceed the assigned threshold Pmax, the next step is a step 203 during which an alarm is sent to the surveillance console of the centralized control station PCC. The centralized control station PCC takes account of the alarm automatically, and generates power limitation set points $\alpha$ which are sent to various vehicles 7 in the following subsequent steps of the method:

In a step 204, a critical status index Vc is assigned in real time to each of the vehicles 7 of the transport system and a critical status index Zc is assigned to each section Si, Sj, Sk, Sl of the power supply lines 4.

The critical status index Vc assigned to each vehicle 7 is calculated as a function of operating conditions and advantageously integrates late running of the vehicles 7, the time interval between the vehicles 7 and load parameters of the vehicles 7. For example, a vehicle 7 that is running late, or is separated by a short time interval from the preceding or following vehicle, or is heavily loaded, is classified as the most critical. The critical status index Vc is on a scale from 0 to 5, for example, the least critical vehicles 7 receiving the critical status index Vc=0 and the most critical vehicles 7 receiving the critical status index Vc=5.

The critical status index Zc associated with the line sections Si, Sj, Sk, Sl is advantageously a function of the status of the traction substations 3 supplying power to the line section and of the geometry of the route in the line section. This kind of index integrates parameters relating to the overloading of the traction substations 3 and to the fact that a traction substation is out of service, that the high-voltage substation 1 feeding the traction substations 3 is overloaded, or that the geometry of the route in the line section concerned, such as an up grade, implies high power consumption by the vehicles. For example, line sections supplied with power by overloaded traction substations 3 or high-voltage substations 1 are classified as critical, while line sections supplying power to vehicles on an up grade are arbitrarily classified as relatively uncritical, to avoid a reduction of power to vehicles traveling on this section. The critical status index Zc is on a scale of 0 to 5, for example, the least critical line sections receiving a critical status index Zc=0 and the most critical line sections receiving a critical status index Zc=5.

In the next step 205, the vehicles 7 to be subject to power limitation are selected, with the highest priority going to the vehicles traveling on the most critical line section and receiving a low critical status index Vc authorizing power limitation. If the number of vehicles 7 satisfying these conditions is insufficient, then vehicles are selected on line sections adjacent the most critical line section and receiving a low critical status index Vc authorizing power limitation. The number of vehicles 7 selected to be subject to power limitation is a function of the power overload measured in step 202 and can be incremented or reduced progressively on each iteration of the method as a function of the tendency of the power exceeding the assigned power threshold Pmax to continue, or conversely to stabilize, and the tendency to fall.

The power limitation is applied by determining for each of the selected vehicles a line current reduction set point $\alpha$ that corresponds to a reduction coefficient to be applied to the maximum current $I_A$ that the converter on board the vehicle 7 receiving the set point is usually authorized to supply to the traction motor. As shown in FIG. 2, the reduction set point $\alpha$ produces a limit line current $I_L$ which satisfies the equation $I_L = \alpha \cdot I_A$.

The value of $\alpha$ is preferably from 70% to 100% and is advantageously a function of the critical status index Vc of the vehicle, as shown in the following table:

| Vc | 0 | 1 | 2 | 3 | 4 | 5 |
|---|---|---|---|---|---|---|
| $\alpha$ | 70% | 76% | 82% | 88% | 94% | 100% |

In the next step 206, the current reduction set points $\alpha$ are sent by radio to the vehicles 7 in order for the converters on board the vehicles to conform to the reduction set point $\alpha$ that is sent to them, after which the method returns to step 201.

The system is therefore capable of assigning power reductions per vehicle, per group of vehicles, or per operating area, and dynamically as a function of the critical status index Zc on the routes of the vehicles.

The above method preferably operates with a cycle time less than 5 seconds so that it can adapt rapidly to consumption peaks. To allow a progressive return to normal operating conditions of the transport system, each of the vehicles 7 runs a re-initialization algorithm, for example, which cancels the last reduction set point $\alpha$ received by the onboard converter if no new set point is received by the same vehicle during a given time period, for example 30 seconds.

This embodiment has the advantage of allowing staggering of the power limitation over the vehicles as a function of the overloaded state of the traction substations and the critical status of the power supply network, in order to minimize the power drawn from the network by the power supply system without significantly disrupting traffic.

Figure 4:
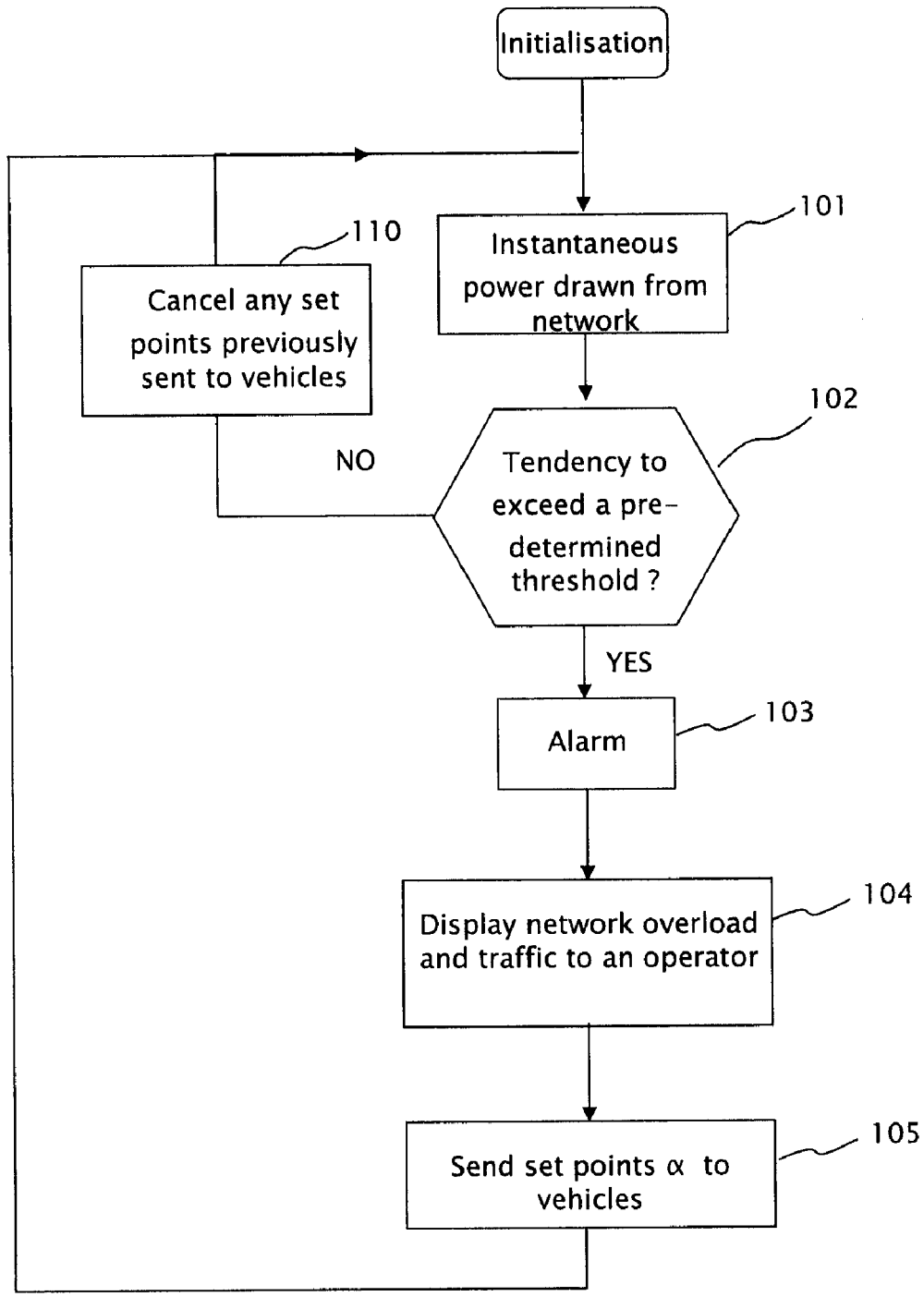
FIGS. 4 to 7 are flowcharts representing the main process steps of different embodiments of the power regulation method according to the invention.
Figure 6:
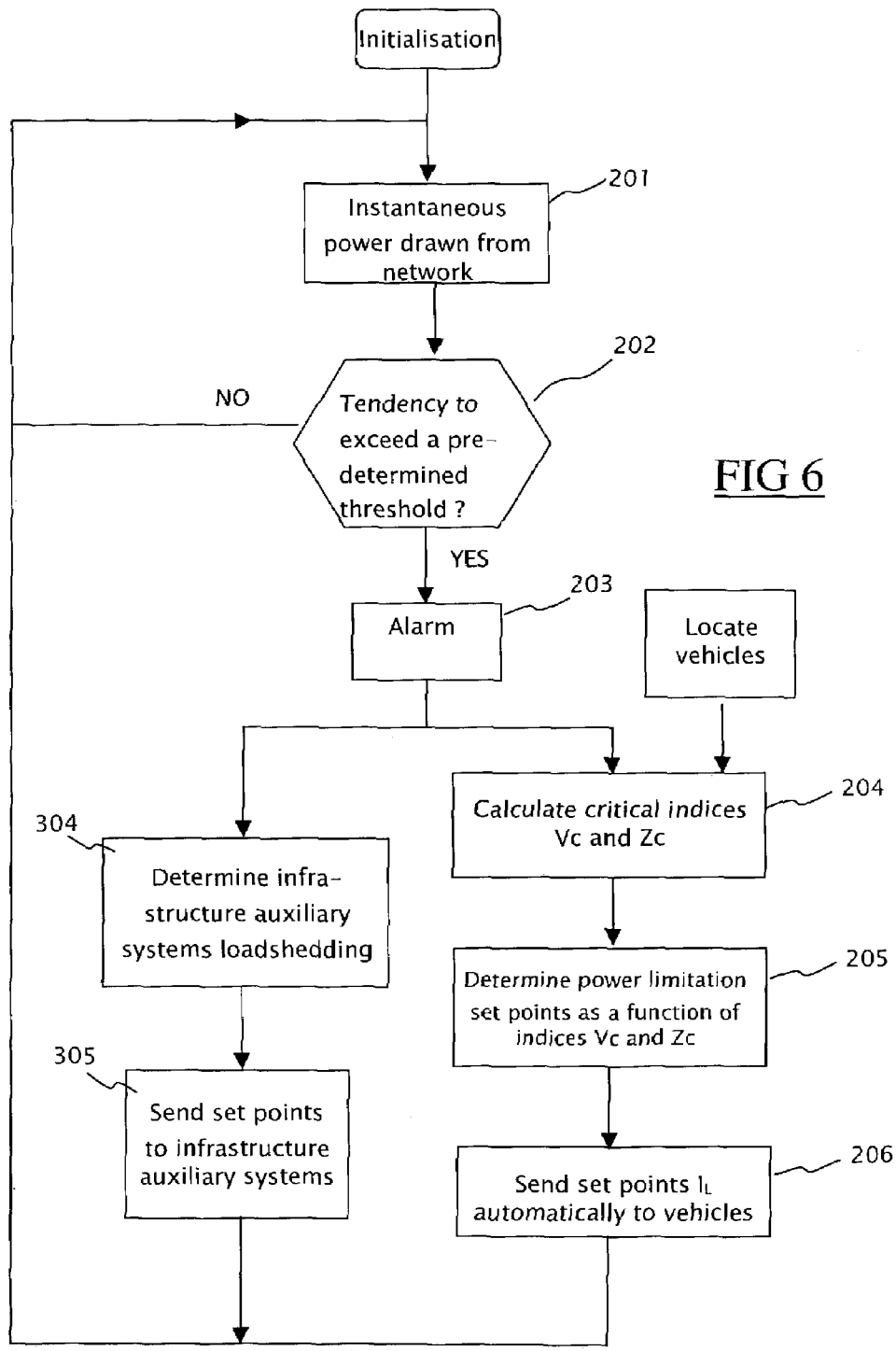

FIG. 6 shows a different embodiment of the regulation method shown in FIG. 4, in which steps 304 and 305 of generating and sending loadshedding set points to the infrastructure auxiliary systems are carried out in parallel with the steps 204 to 206 previously described. In this embodiment, the power regulation method includes a step 304 in which loadshedding set points are generated at the PCC as a function of the trend and the level of the overload measured in step 202. The loadshedding set points are intended to reduce the consumption of the infrastructure auxiliary systems and comprise, for example, instructions to turn down passenger comfort systems, for example ventilation, air conditioning and lighting systems, or other mechanical equipment in the stations 5.

During the next step 305, the loadshedding set points are sent to the various infrastructure auxiliary systems via the optical fiber transmission network 6.

This embodiment has the advantage of further reducing the power drawn by the transport system from the external network without compromising safety and without significantly degrading the comfort of passengers.

Figure 7:
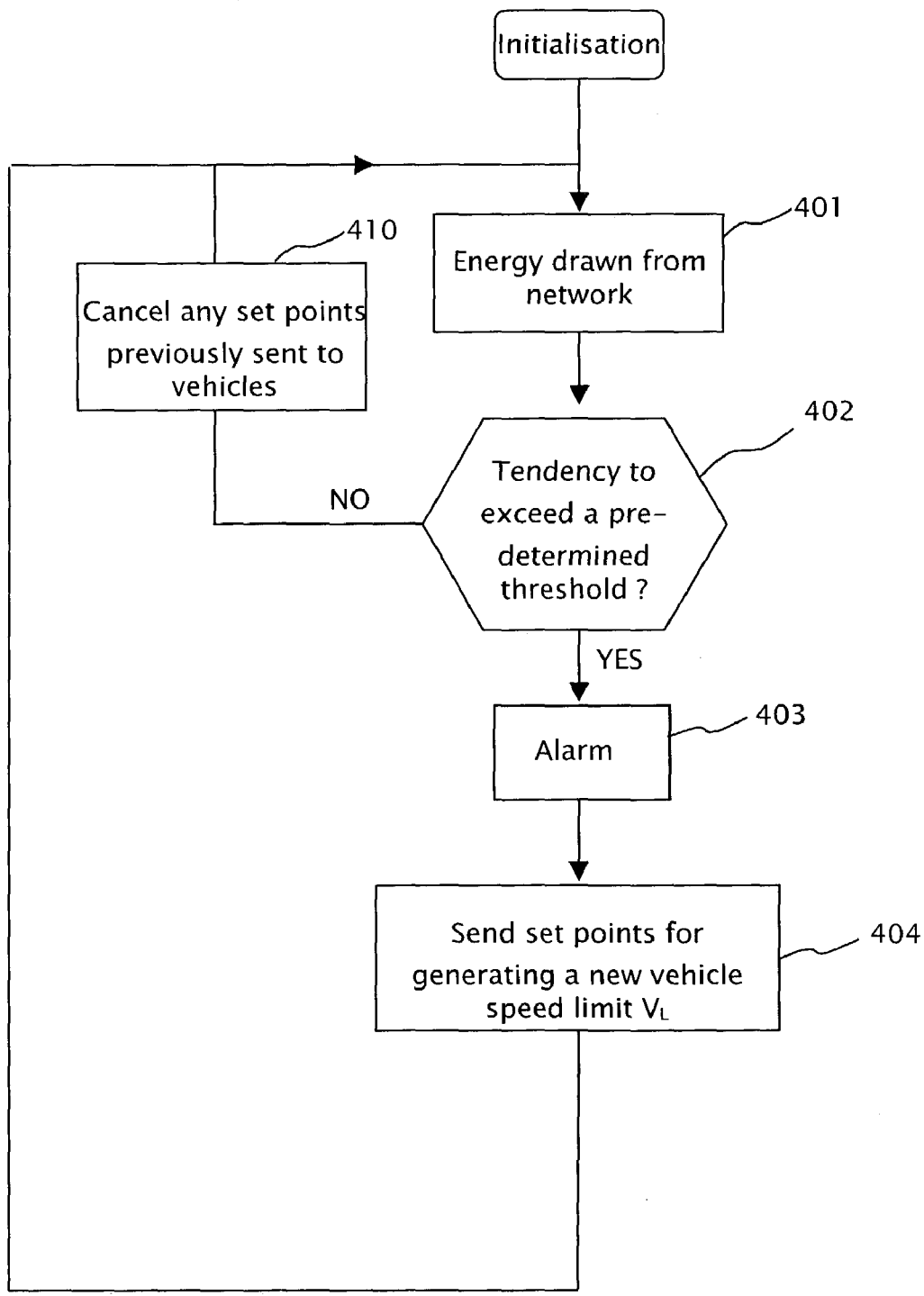

FIG. 7 shows another embodiment of the regulation method of the invention described in FIG. 4, in which the maximum energy absorbed by vehicles is monitored and regulated.

As shown in FIG. 7, the method includes a first step 401 in which the total energy drawn from the external electrical power supply network, e.g. over a duration of 10 minutes, is calculated from energy or "work" information W sent from each of the metering points in the high-voltage substations 1 and 2.

In step 402 of the method, the total energy calculated above is compared with an assigned energy threshold Wmax corresponding to the value of energy specified in the contract negotiated with the electrical power supplier, the specified threshold Wmax being extracted from memory.

If the total energy drawn from the network has no tendency to exceed the threshold Wmax, the method returns to step 401.

When, following step 402, the total energy drawn from the external network is tending to exceed the assigned threshold Wmax, the next step of the method is a step 403 in which an alarm is sent to the monitoring console of the centralized control station PCC, the alarm being taken into account for manually or automatically establishing the consumed-energy limitation set points $\beta$ transmitted to the vehicles 7.

The set points $\beta$, which are sent during step 404, correspond to a reduction coefficient of the normally-assigned maximum speed $V_M$ of the vehicle, such that the new limit speed of the vehicle is $V_L=\beta \cdot V_M$, with reference to FIGS. 2 and 3. By way of example, the value β lies in the range 60% to 100% as a function of the distance between the passenger stations disposed ahead of and behind the vehicle. The automatic establishment of the set points β is performed by a method similar to that described for establishing the set points α in FIG. 5, taking account of a critical status index Vc assigned to each vehicle 7. The index Vc advantageously integrates the following parameters: the late running of the vehicle 7, the load and the distance to the next passenger station so that the vehicles furthest from the next passenger station, the most loaded, and running the latest are classed as the most critical such that they receive a set point β close to 100%. The value β is transmitted to each vehicle using transmission means similar to those described above or, in preferred manner, it is transmitted at each passenger station by local transmission means, such as infrared, since the value β depends on the distance between the passenger stations.

Conversely, when in step 402 the total energy drawn from the network no longer has any tendency to exceed the authorized threshold Wmax, the method then passes to step 110 in which any speed reduction set points β previously sent to the vehicles are progressively eliminated, after which the method returns to step 401.

In another embodiment of the invention (not shown), the reduction of power and of energy per vehicle can be simultaneous, the set point transmitted to the vehicle thus being a pair τ=(α, β), where α and β correspond respectively to the line current reduction value and to the maximum speed reduction value as defined above.

The embodiments of the invention previously described have the main object of preventing the instantaneous overall power drawn by the transport system from the external electrical power supply network exceeding the nominal power and/or the energy specified in the contract negotiated with the supplier, to avoid additional charges. However, in a different application, the method and the system according to the invention could also be used with the single aim of saving electrical power, even if the external electrical power supply is not operated at maximum power or the vehicles are not operated at maximum power.

The method according to the invention then operates in a similar manner to the method previously described, with only the criteria for selecting the assigned value of Pmax being different, since Pmax becomes a set point threshold that can be adjusted as a function of the required power saving.

Of course, the invention is in no way limited to the embodiments described and shown, which are provided by way of example only and are open to modification, in particular by modifying the composition of their component parts or by substituting technical equivalents, without departing from the scope of protection of the invention.

Thus the method and the system according to the invention can be applied to any type of transport system, such as underground railway, tram, trolleybus, high-speed train systems, etc., regardless of the type of voltage used.

What is claimed is:

1. A method or monitoring and regulating power and energy consumed by a transport system comprising electrically propelled vehicles and a power supply system comprising one or more power supply substations connected to an external electrical power supply network, the method comprising:

measuring instantaneous at least one of electrical power and energy drawn from the external electrical power supply network by said power supply substation or substations; and if the power or energy drawn from the external network exceeds an assigned threshold, sending one or more vehicles a set point acting on a converter on board of said vehicle temporarily reducing at least one of the power and speed of rotation of a traction motor of said vehicle, wherein said vehicles move in accordance with a control profile, said control profile comprising starting the vehicle with a constant traction force which is applied until a maximum power is consumed by the vehicle, subsequent acceleration of the vehicle up to a maximum speed conforming to an equal power equation comprising traction force of the vehicle times speed of the vehicle is to remain constant.

2. A method according to claim 1, wherein said vehicles move in accordance with the control profile, said control profile comprising starting of the vehicles with the constant traction force which is applied until a line current $I_A$ flows in the onboard converter, wherein the value of the line current $I_A$ depends on the nominal operating current of the traction motor or to a lower value modulated as a function of the load of the vehicle, wherein subsequent acceleration of the vehicle up to the maximum speed is conforming to the equal power equation.

3. A method according to claim 1, wherein said vehicles move in accordance with a control profile whereby starting is effected in compliance with an equation specifying how speed is increased up to an authorized maximum speed.

4. A method according to claim 2, wherein the set point sent to the vehicle is a reduction set point α for limiting the line current $I_A$ to a value $I_L=\alpha \cdot I_A$.

5. A method according to claim 1, wherein the set point sent to the vehicle is a reduction set point β for the maximum speed provided by the converter on board said vehicle to the motor, wherein said set point β is provided to the converter on board the vehicle to limit the speed of rotation of the traction motor.

6. A method according to claim 4, wherein vehicles receiving at least one of set points α and set points β is selected from vehicles of the transport system as a function of a critical status index $V_C$ assigned to each vehicle and a critical status index $Z_C$ assigned to each power supply line section.

7. A method according to claim 6, wherein:

the power supply substation or substations supply energy to traction substation supplying power to the power supply line sections having vehicle-mounted current pick-up means connected thereto, each vehicle carrying the power converter which is supplied with power by said current pick-up means and which monitors at least one of the power and the speed of rotation of the traction motor of said vehicle, and the critical status index $V_C$ assigned to each vehicle is based on at least one of late running of the vehicle, the time interval between successive vehicles, and the load of the vehicle, and wherein the critical status index $Z_C$ assigned to each power supply line section allows for at least one of the status of the traction substations and the power supply substation supplying power to said section, and geometry of a route followed by the vehicles in the line section.

8. A method according to claim 4, wherein at least one of reduction set points α and reduction set points β received by each of vehicles is modulated as a function of the critical status index $V_C$ assigned to respective vehicle.

9. A method according to claim 8, wherein the value of said set point α is from 70% to 100%, as a function of the critical status index $V_C$ of the respective vehicle.

10. A method according to claim 8, wherein the value of said set point β is from 60% to 100%, as a function of the critical status index $V_C$ of the respective vehicle.

11. A method according to claim 1, wherein, if said transport system comprises significant infrastructure auxiliary systems supplied with electrical power by a power supply substation, as well as sending set points to vehicles, the set points are sent for reducing the operating regime of the less critical infrastructure auxiliary systems.

12. A method according to claim 1 for monitoring and regulating the power consumed by a transport system, wherein the value of at least one of said assigned power and energy threshold is a function respectively of predetermined power and energy maximums set by the external electrical power supplier, said thresholds being adaptable as a function of the time or the season.

13. A method according to claim 12, wherein said power and energy thresholds are temporarily assigned values below the nominal power and energy values set by the external electrical power supplier.

14. A method according to claim 3 for monitoring and regulating the power consumed by a transport system, wherein the method further comprises:
    measuring electrical parameters supplied by traction substations that supply power to power supply line sections having vehicle-mounted current pick-up means connected thereto; and
    selecting vehicles to which at least one of set points α and set points β are sent based on results of the measuring of the electrical parameters,
    wherein each vehicle carries a power converter which is supplied with power by said current pick-up means and which monitors the power and/or the speed of rotation of the traction motor of said vehicle, and
    wherein the power supply substation or substations supply energy to the traction substations.

15. A system for monitoring and regulating the power and the energy consumed by a transport system comprising a plurality of vehicles having an electric traction motor and a power supply substation connected to an external electrical power supply network, the system comprises:
    a measurer measuring and metering the electrical power drawn from the external electrical power supply network by the power supply substation;
    a detector detecting times at which at least one of the power and the energy drawn from the external network exceeds an assigned threshold; and
    a transmitter sending at least one set point to at least one vehicle if the power or the energy drawn from the external network exceeds said threshold, said set points provided to a converter on board said vehicle temporarily reducing the at least one of power and the speed of rotation of the traction motor of said vehicle,
    wherein said vehicles move in accordance with a control profile whereby the vehicles are started in compliance with a constant traction force which is applied until a maximum power is consumed by the vehicle, and wherein subsequent acceleration of the vehicles are up to a maximum speed conforming to an equal power equation comprising traction force of the vehicle times speed of the vehicle is to remain constant.

16. A system according to claim 15 for monitoring and regulating the power consumed by a transport system, wherein said set points sent to the vehicle are at least one of current reduction set points α and speed reduction set points β, said set point α provided to the converter on board said vehicle limits the line current to below the limit current $I_A$, and said set point β provided to the converter on board limits the speed of rotation of the traction motor.

17. A power monitoring and regulating system according to claim 15, wherein the set points are sent to the vehicles from a centralized control station by means of a radio transmission system or, in a station, by an infrared transmission system.

18. The method according to claim 11, wherein the less critical infrastructure auxiliary systems comprises at least one of a ventilation system, an air conditioning system, and a lighting system of stations.

19. The system according to claim 15, wherein the power supply substation or substations supply energy to traction substations supplying power to power supply line sections having vehicle-mounted current pick-up means connected thereto and wherein each vehicle carrying a power converter is supplied with power by said current pick-up means and monitors at least one of the power and the speed of rotation of the traction motor of said vehicle.

20. The method according to claim 1, wherein the measuring of at least one of the electrical power and energy drawn from the external electrical power supply network comprises measuring active power, reactive power, and wattage drawn from the external source and billing the transport system based on results of said measuring.

21. The method according to claim 1, wherein the transport system comprises a plurality of power supply substations, wherein each power supply substation measures at least one of the electrical power and energy drawn from the external electrical power supply network and sends results of the measurement to a control station, and wherein the control station computes at least one of total electrical power and energy drawn from the external electrical power supply network.

22. The method according to claim 21, wherein the plurality of substations comprise a first type of substation supplying power or energy to respective traction substations that supply power or energy to the vehicles and a second type of substation supplying power or energy to auxiliary systems of the transport system.

23. The method according to claim 1, wherein, if the power or energy drawn from the external network exceeds the assigned threshold, sending at least one vehicle the set point acting on the converter on board of respective vehicle, wherein the sent set point acts on the converter such that the maximum line current power that is supplied to the onboard converter of said respective vehicle is reduced.

24. The method according to claim 1, wherein, if the power or energy drawn from the external network exceeds the assigned threshold, sending at least one vehicle the set point acting on the converter on board of respective vehicle, wherein the set points act on the converter such that the speed of rotation of the traction motor of said respective vehicle is temporarily reduced, wherein the speed of rotation of the traction motor is a maximum speed of rotation assigned to the traction motor of the respective vehicle.

* * * * *